INVENTOR
HUGO W. SCHAFFT
BY
Mueller, Aichele & Rauner
ATTYS.

ns Patent Office 3,397,328
Patented Aug. 13, 1968

3,397,328
VOLTAGE GENERATION UTILIZING
PIEZOELECTRIC EFFECTS
Hugo W. Schafft, Des Plaines, Ill., assignor to Motorola, Inc., Franklin Park, Ill., a corporation of Illinois
Filed June 14, 1966, Ser. No. 557,508
10 Claims. (Cl. 310—8.1)

This invention relates generally to piezoelectric devices, especially those used to generate periodic and aperiodic voltage waves.

Periodic voltage waves find applications in television deflection circuits, such as the well-known flyback transformer generated deflection voltages. The use of transformers in generating such voltages is relatively expensive in that, inter alia, windings have to be carefully formed to insure the desired voltage characteristics are obtained. It is known that piezoelectric materials can be used to generate voltages corresponding to varying internal mechanical stresses, such as, shear and compressional shock waves. If such devices could be used for generation of high voltage waves, a simpler low cost periodic voltage generate signal can be provided.

Therefore, it is an object of this invention to provide a simple, low cost periodic or aperiodic voltage wave generator utilizing piezoelectric effects.

It is another object of this invention to provide a piezoelectric voltage generator which is mechanically actuated.

It is a further object of this invention to provide an electrically actuated piezoelectric voltage generator which provides two voltage output waves for each input voltage wave.

Referring now to the accompanying drawing.

According to this invention there is provided a piezoelectric material having two end portions separated by an elongated middle portion. The first end portion is stimulated to provide internal mechanical stresses, such as shock waves, which travel through the middle portion toward the second end portion. Attached to the middle portion are a plurality of spaced apart voltage sensing electrodes. A plurality of series connected rectifiers are respectively connected between adjacent spaced-apart electrodes. Alternating polarity voltage waves generated by a shock wave within the piezoelectric middle portion appears across each pair of adjacent electrodes. The respective rectifier shunts out one polarity of the piezoelectrically generated voltage wave and blocks the other polarity such as to store such other polarity voltage in the inherent capacitance of the piezoelectric material. The output voltage waveform is taken across opposite ends of the series circuit formed by the rectifiers. In the illustrated embodiments, due to the rectifier action the polarity of the output voltage waveform is always the same. Two embodiments are illustrated, one which electrically actuates the shock wave by an input electrical impulse and a second embodiment which uses a mechanical actuator for generating shock waves. Either embodiment may be used to produce periodic or aperiodic output voltages.

Figure 1:
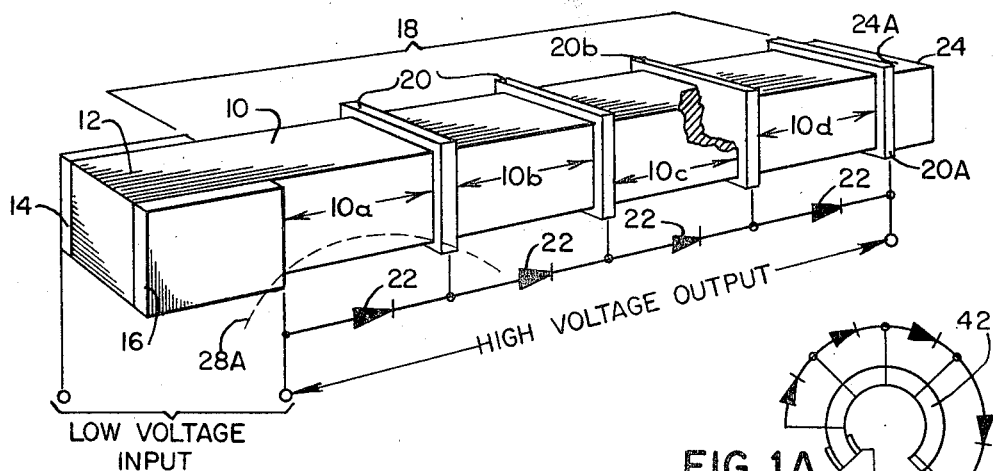
FIG. 1 is a combined schematic and perspective view of an electrically actuated preferred embodiment of the subject invention, together with a modification providing an alternate embodiment.

Referring now to FIG. 1 there is shown a bar 10 of piezoelectric material. A first end portion 12 has oppositely disposed input electrodes 14 and 16 for impressing an input electrical wave thereacross for piezoelectrically generating a shock wave which travels through the middle portion 18 toward the opposing end 24. A plurality of intermediate electrodes 20 are disposed in spaced apart relationship along middle portion 18. Such electrodes may be bands plated around bar 10. The piezoelectrically generated voltages between adjacent spaced apart electrode 20 are summed together by a series circuit consisting of rectifiers 22 with the summed voltage taken between electrode 16 and the most remote electrode 20A.

Rubber end portion 24A is attached to bar 10 immediately adjacent electrode 20A for dissipating by absorption received shock waves traveling through the bar 10. This absorption prevents shock wave reflection and thereby standing waves in the bar 10 which detract from voltage generation.

Figure 2:
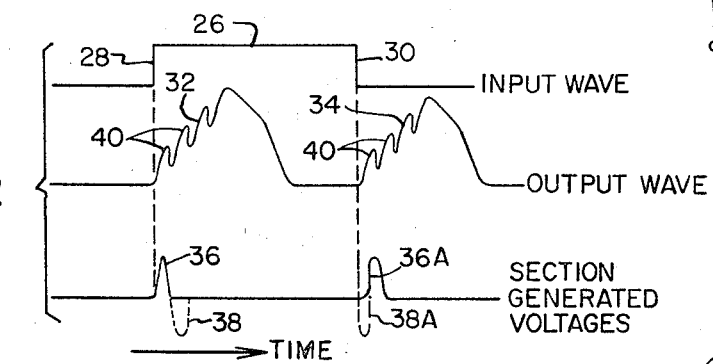
FIG. 2 is a diagrammatic showing of waveforms used to describe the operation of the FIG. 1 embodiment.

Operation of the FIG. 1 embodiment is best understood with reference to the FIG. 2 illustrated waveforms. Input wave 26 having sharp rising wavefront 28 and sharp falling trailing edge 30 is applied to the bar 10 across the electrodes 14 and 16. Wavefront 28 acts upon bar 10 to piezoelectrically generate shock wave 28A, shown in FIG. 1 as a dotted line. Shock wave 28A traverses bar 10 from end portion 12 to end 24. Input wave 26 actuates the FIG. 1 assembly to provide two output voltage waves 32 and 34. Output waves 32 and 34 are the summation of the voltages generated between adjacent electrodes 20 which are termed "section generated voltages." Waves 32 and 34 are taken from the ends of the series circuit formed by rectifiers 22, that is, from electrodes 16 and 20A. Wave front 28 generated shock wave 28A piezoelectrically generates voltage wave 36 between each and every pair of adjacent electrodes 20. The respective diode 22 is forward biased to current conduction to shunt or clamp out the generated voltage to limit the generated voltage to wave 36. Dotted line 38 indicates the opposing polarity of the generated voltage wave which is clamped out by action of diode 22. Shock wave 28A generates a voltage having the phase indicated by the combination of lines 36 and 38. Trailing edge 30 of input wave 26 piezoelectrically generates a voltage wave having the opposite phase, as indicated in FIG. 2, by dotted line 38A appearing before wave 36A. The respective diode 22 again is forward biased to current conduction to clamp out the polarity of the generated voltage indicated by dotted line 38A. Voltage wave 34 begins to rise somewhat later with respect to trailing edge 30 than does output wave 32 with respect to rising front 28. The voltage humps 40 in the waves 32 and 34 correspond to the generated voltages in succeeding section 10A, 10B, 10C and 10D which individually correspond to voltage waves 36 and 36A. In each wave 32 and 34 there are four voltage humps 40 each respectively corresponding to and generated by the four illustrated sections 10A, 10B, 10C and 10D of bar 10 formed between adjacent electrodes 20.

Spaced apart electrodes 20 preferably are metal band plated around bar 10. The portion of bar 10 covered by the bands 20 is inoperative to generate signals from the shock wave because of the shorting action of bands 20. Numeral 20B indicates an alternate form of spaced apart electrode in that it is a plate extending through and crosswise to the bar 10 length. Bands 20 are preferred because of simpler construction.

The shape of waves 32 and 34 may be varied by varying the spacing between the electrodes 20. The closer the spacing the lower the magnitude of the generated voltage therebetween and therefore the smaller the hump 40.

For optimum operation the spacing between adjacent electrodes 20 should be such that the shock wave portion therebetween, when the peak is centered therebetween, is as flat as possible, see FIG. 1 shock wave 28A.

Figure 1A:
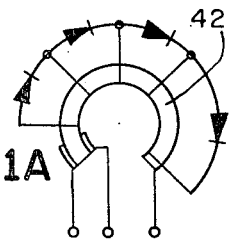

Referring now to FIG. 1A there is shown a horseshoe shaped piezoelectric bar 42 which corresponds in all de tails to the FIG. 1 embodiment except for the horseshoe shape. FIG. 1A is used only to illustrate that the particular configuration of piezoelectric material may take any form whatsoever. It is to be further understood that the invention is not limited to bar shaped materials. In testing the configuration of FIG. 1A a step-up in voltage of about 6 to 1 was obtained by using a seven section piezoelectric voltage wave generator.

Figure 3:
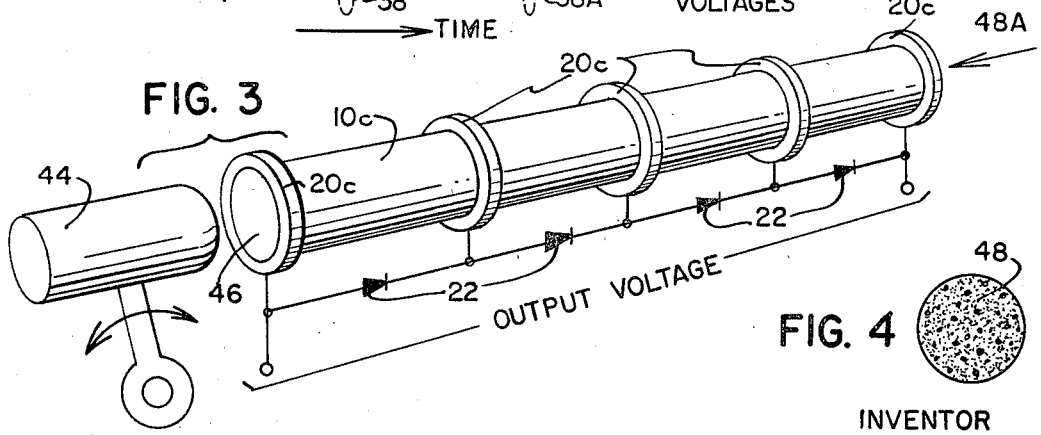
FIG. 3 illustrates in a combined schematic and perspective view a mechanically actuated voltage wave generator.

Referring now to FIG. 3, there is shown a mechanically actuated piezoelectric voltage wave generator. Bar 10C in the form of a solid cylinder is provided having spaced apart output electrodes 20C in the form of annular bands lated circumferentially thereon for detecting the generated voltages. A series circuit of rectifiers 22 are connected across the respective electrodes for providing an output signal across the ends of the series circuit. A movable hammer 44 is placed in juxtaposition with end face 46 on the first portion of bar 10C. Causing hammer 44 to strike face 46 introduces a shock wave in bar 10C which operates to piezoelectrically generate voltages as described with respect to FIG. 1. Operation of diodes 22 with respect to the generated voltages is identical to that described with respect to FIG. 2 except that each time hammer 44 strikes face 46 one output wave is generated.

Figure 4:
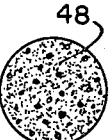
FIG. 4 is an end view of the terminating end of the FIG. 3 embodiment.

Referring now to FIG. 4 there is shown an alternate method of dissipating the shock wave to avoid reflected shock waves. Face 48 of the bar 10C second end portion, as seen by looking in the direction of arrow 48A, has a roughened end for dispersing the received shock wave in several directions. In this manner the shock wave is dissipated to avoid reflections.

What is claimed is:
1. For generating an electric voltage wave, in combination:
   piezoelectric means including a capacitance and having first and second end portions and a middle portion between the end portions,
   means form introducing a mechanical stress into the piezoelectric means in said one end portion such that the stress travels through the middle portion to said second end portion,
   a plurality of electrode means spaced apart along the middle portion such that a shock wave traveling therealong piezoelectrically generates electrical voltages between adjacent electrode means,
   and a series electrical circuit interconnecting the electrodes and including a plurality of rectifiers respectively connecting adjacent electrodes such that generated voltages between adjacent electrodes of a first polarity are shunted out while electrical voltages of a second plurality are blocked by the rectifiers and stored in capacitance of the piezoelectric means and the combination being such that the summation of the stored voltages appear across such series circuit.

2. The combination of claim 1 wherein the second end portion is formed so as to dissipate any mechanical stresses received thereby for preventing shock wave reflections.

3. The combination of claim 2 wherein said second end portion has a roughened face.

4. The combination of claim 2 wherein said second end portion has resilient material attached thereto.

5. The combination of claim 1 wherein the introducing means consists of a pair of electrodes for receiving electrical signals to impose a varied electric field across said first end portion for piezoelectrically introducing a mechanical stress into said piezoelectric means.

6. The combination of claim 5 wherein said spaced apart electrode means are metal bands disposed around the piezoelectric means.

7. The combination of claim 6 wherein said rectifier means are semiconductor diodes all poled in the same direction and respectively connected between adjacent bands.

8. The combination of claim 7 wherein the piezoelectric means is shaped such that the middle portion has a length along which the mechanical stress travels in a form of a shock wave which is substantially greater than any other dimension of said means.

9. The combination of claim 1 wherein the introducing means is a mechanical device which strikes said first end portion.

10. The combination of claim 9 wherein the spaced apart electrodes are metal bands disposed around the piezoelectric means.

References Cited
UNITED STATES PATENTS

| | | | |
|---|---|---|---|
| 2,443,471 | 6/1948 | Mason | 333—72 |
| 2,806,155 | 9/1957 | Rotkin | 310—8.1 |
| 2,921,134 | 1/1960 | Greenspan | 310—8.1 |
| 2,974,296 | 3/1961 | Rosen | 333—72 |
| 2,975,354 | 3/1961 | Rosen | 321—8 |
| 3,246,164 | 4/1966 | Richmond | 310—8.1 |
| 3,271,622 | 9/1966 | Malagodi | 310—8.1 |
| 3,334,307 | 8/1967 | Blum | 333—30 |

J. D. MILLER, *Primary Examiner.*